Nov. 8, 1949      E. F. CHANDLER      2,487,310
SQUARE ROOT EXTRACTING DEVICE
Filed Jan. 24, 1946
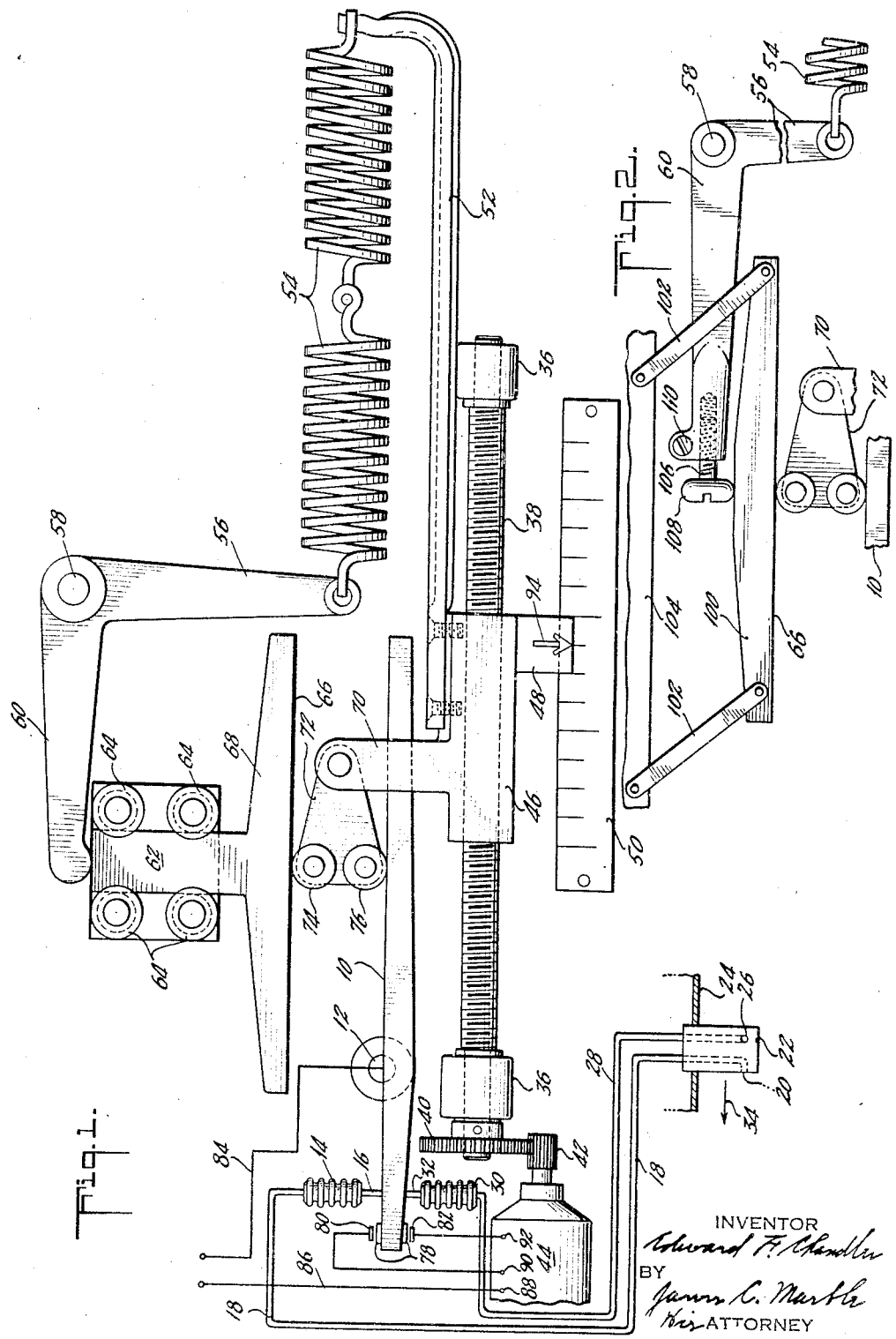

Patented Nov. 8, 1949

2,487,310

UNITED STATES PATENT OFFICE 2,487,310

SQUARE ROOT EXTRACTING DEVICE

Edward F. Chandler, Brooklyn, N. Y., assignor to Pitometer Log Corporation, New York, N. Y., a corporation of New York Application January 24, 1946, Serial No. 643,175

8 Claims. (Cl. 74—522)

My invention relates to a device for extracting the square root of a value represented by a force.

In accordance with my invention a force, the square root of which is desired to be extracted, is applied to a lever and at the same time a balancing force is applied to the lever. The point of application and the magnitude of this balancing force are varied simultaneously until the lever is in balance. In order to obtain this simultaneous variation there is provided a linearly displaceable member which carries means for varying the point of application of the balancing force and at the same time varies the tension of a spring which is employed to produce the balancing force, the force being transmitted from the spring to the lever through a second lever which is pivotally mounted on a fixed axis. As will hereinafter be explained, the distance measured along the first mentioned lever from its pivot point to the place where the balancing force is applied thereto is proportional to the square root of the first force applied to the lever.

Such device may have numerous applications, but it is particularly well adapted in connection with a flow meter or a ship's log. The function of either a flow meter or a ship's log is to measure the speed of liquid relative to a pipe or a ship's hull. It is well known that the difference between the dynamic and static pressures produced by a moving liquid is proportionate to the square of the velocity of the liquid, and hence it is necessary to extract the square root of this difference in pressures in order to obtain a reading which is directly proportionate to the velocity. For the sake of illustration, the device is shown herein in connection with a ship's log.

Further objects and advantages will be apparent from the following description considered in connection with the accompanying drawing which forms part of this specification and in which:

Fig. 1 is a more or less diagrammatic view of a first embodiment of my invention; and Fig. 2 is a similar view of a portion of an apparatus in accordance with a modified embodiment.

Referring to Fig. 1, reference character 10 designates a lever arm which is pivotally mounted about the fixed axis 12. An expansible bellows 14 has its upper end fixed, while force resulting from the tendency of the bellows to expand, and thus to displace its lower end downwardly, is transmitted to the lever 10 through the rod 16. The interior of the bellows 14 is connected by means of the conduit 18 with the dynamic orifice of a differential Pitot member 22, which extends through the hull 24 of a ship at a suitable distance below the water line. The static orifice 26 of the Pitot member is connected by means of a conduit 28 with the interior of an expandable bellows 30 arranged on the opposite side of the lever 10 from the bellows 14. Force resulting from a tendency of the bellows 30 to expand due to fluid pressure therein is transmitted to the lever by means of the rod 32. It will thus be seen that the resultant force applied to the left end of lever 10 is the difference between the forces exerted by the two bellows, which in turn is proportionate to the difference between the dynamic and static pressures produced in the respective orifices of the Pitot member when the latter is moved through the water in the direction of the arrow 34.

Rotatably mounted in a pair of fixed bearings 36 is a threaded shaft 38, the bearings being capable of taking thrust so as to prevent axial displacement of the shaft. One end of the shaft is provided with a gear 40 which meshes with a pinion 42 mounted on the shaft of a reversible electric motor 44.

The shaft 38 extends through a threaded bore in a carriage 46. This carriage is prevented from rotating by any suitable means, such as an arm 48 formed with a slotted end which slides along a fixed bar 50. Consequently, rotation of the shaft 38 causes the carriage to move linearly. Fixed to carriage 46 for movement therewith is a rigid arm 52, the outer end of which serves as a displaceable anchor for a spring 54. As shown, this spring is made up of two parts reversely wound with respect to each other in order to compensate for temperature changes, as is well known. The opposite end of the spring 54 is secured to the arm 56 of a bellcrank lever which is pivoted about a fixed axis 58. The other arm 60 of the bellcrank lever bears against the upper end of a member 62. Movement of the member 62 is constrained to a straight line by means of suitable guide rollers 64. Member 62 has the shape of an inverted T, and the lower edge 66 of the arms 68 forms a flat surface which is disposed parallel to the axis of the threaded shaft 38.

The carriage 46 has an arm 70 to the upper end of which is pivotally mounted a member 72. This member carries rollers 74 and 76. The roller 74 is arranged to roll on the lower surface 66 of the member 62, while the roller 76 rolls along the upper surface of the lever 10.

The lever 10 carries a contact 78 disposed between fixed contacts 80 and 82. These fixed contacts limit the pivotal movement of lever 10 to a narrow range. The contact 78 is connected by means of a conductor 84 with one side of a suitable source of electricity while the other side of this source is connected by means of a conductor 86 with a terminal of the motor 44. The fixed contacts 80 and 82 are connected to terminals 90 and 92, respectively, of the motor. The construction of the motor is such that when current is applied thereto through the terminals 88 and 90 it rotates in one direction, while it is caused to rotate in the reverse direction if current is supplied through the terminals 88 and 92.

The bar 50 may be calibrated in units of speed, such as miles per hour or knots, while the arm 48 on the carriage may be provided with an index, such as the arrow 94. The parts should be so dimensioned that when the carriage is in the position in which the arrow 94 reads zero speed on the scale, the roller 76 is in vertical alignment with the pivotal axis 12.

The above described device operates as follows. It will first be assumed that the parts are in the position just described, which will be the case when the ship is stationary in the water. Under these conditions the pressure on the dynamic orifice 20 will be the same as that on the static orifice 26 and hence the difference in the pressures exerted by the bellows 14 and 30 will be zero. Therefore, no force is applied to the left end of the lever arm 10. Due to the fact that the roller 76 is in alignment with the pivotal axis 12, the effective length of the lever arm between the axis 12 and the roller 76 will of course be zero. Also, under these conditions, the spring 54 will be under zero tension and hence the bellcrank lever will exert no force on the member 62. The lever arm 10 under these conditions will be in balance, it being assumed that if necessary suitable counterweights will be provided. The contact 78 is spaced from both the fixed contacts, and therefore the motor 44 is idle.

However, as soon as the ship gets under way, the dynamic pressure increases while the static pressure remains constant. Therefore, the force produced by the bellows 14 is greater than that produced by the bellows 30, whereupon the lever 10 pivots counterclockwise so as to close the circuit through the contacts 78 and 82. This causes motor 44 to rotate in the proper direction to cause the carriage 46 to advance to the right, as viewed in the drawing. This moves the roller 76 away from the pivot point 12, and at the same time displaces the movable anchor of the spring 54 so as to place this spring under tension. This tends to pivot the bellcrank lever in a counterclockwise direction, thus causing it to apply force through the member 62 and the rollers 74 and 76 on the member 72, to the lever arm 10. Thus, as the carriage moves to the right the balancing force applied to the lever 10 increases for two reasons. First, the effective length of the lever arm between the pivot axis 12 and the roller 76 increases, and, second, the force produced by the spring 54 increases. The spring 54 is constructed so that its tension is a direct linear function of its length. Consequently, the distance through which the carriage must travel in order to restore the balance of the lever arm 10 is proportionate to the square root of the resultant force applied to the left end of the lever arm, and consequently this distance is directly proportionate to the speed of the ship through the water.

When the balance of the lever arm has been restored the contacts are open and the motor stops. Should the speed of the ship thereafter decrease, the resultant force applied to the lever arm by the bellows decreases, and the force applied to the right end of the arm by the spring 54 predominates, causing the arm to pivot in a clockwise direction so as to close the circuit through the contacts 78 and 80. This causes the motor to rotate in the opposite direction thereby moving the carriage 46 to the left. This in turn simultaneously decreases the tension on the spring 54 and decreases the effective length of the lever arm between the pivot axis 12 and the roller 76. When the balance of the lever arm is again restored the arrow 94 will indicate the new speed of the ship.

In Fig. 2 the parts which are the same as those shown in Fig. 1 have been designated by the same reference characters. However, in this embodiment the member 62 of Fig. 1 has been replaced by a movable member 100 having a lower edge 66 forming a flat surface. Member 100 is pivotally supported by means of a pair of equal length arms 102, which are pivotally connected to a fixed support 104. These arms, while permitting up and down movement of the member 100, constrain movement of this member so that the surface 66 thereon remains parallel to itself in all positions of the member.

As shown in this embodiment, the arm 60 of the bellcrank lever is provided with a screw 106 which may be screwed into and out of a threaded bore in the end of the arm in order to vary the effective length of the latter. This screw is provided with a rounded head 108 which bears on the upper edge of member 100. A setscrew 110 is provided for locking the screw 106 in adjusted position. The purpose of the adjustment is to vary the effective force applied by the spring 54 to compensate for variations occurring during construction of the apparatus, such as variations in the strength of the spring, diameter of the bellows and in the pressure produced by the dynamic orifice of the Pitot member.

The operation of this embodiment is substantially the same as that of Fig. 1. Increased tension in the spring 54 caused by travel of the carriage to the right, causes a slight counterclockwise pivoting of the bellcrank lever, the arm 60 thereof thus applying force to the movable member 100. This member is able to move downwardly parallel to itself, swinging on the arms 102, and thus to transmit force from the surface 66 through the member 72 to the lever 10, which causes the latter to pivot in a clockwise direction to open the circuit through the contacts, the closure of which caused the aforesaid movement of the carriage.

Obviously, the arrangement for varying the effective length of the arm 60 of the bellcrank lever shown in Fig. 2 could be applied to the embodiment illustrated in Fig. 1 in order to compensate for the aforesaid variation.

While I have shown and described two preferred embodiments of my invention, it is obvious that numerous changes may be made within its scope. If the device were to be used as a flow meter, the scale on the bar 50 could be calibrated in feet per second or for a given size of pipe, in gallons per second. If a continuous reading were not desired, the electric motor and contacts could be omitted and the threaded shaft be provided with a hand crank. In such case, when a reading is desired, the operator could turn the crank until the lever arm 10 is in balance, whereupon the arrow 94 would indicate the correct reading at that instant. Consequently, the scope of my invention is not to be limited by the foregoing description, which has been given for purposes of illustration only, but is to be determined by the appended claims.

What is claimed:

1. In an apparatus of the character described, a first lever arm pivotally mounted on a first pivot, means for applying a first force to said lever arm, a second lever arm pivotally mounted on a pivot fixed with respect to said first pivot, spring means attached at one end to said second lever for applying thereto a balancing force, a linearly movable member, transmitting means carried by said member and movable therewith along said first lever arm for transmitting thereto force applied to said transmitting means, means for applying the balancing force from said second lever arm to said transmitting means at a mechanical advantage which is constant and independent of said displacement, and an anchor for the opposite end of said spring means carried by said linearly movable member, whereby movement of the latter simultaneously varies the tension of said spring means and the distance between said first pivot and said transmitting means.

2. In an apparatus of the character described, a first lever arm pivotally mounted on a first pivot, means for applying a first force to said lever arm, a member linearly displaceable in a direction substantially parallel to said lever arm, a bellcrank lever pivotally mounted on a pivot fixed with respect to said first pivot, spring means connected between said member and said bellcrank lever so that displacement of said member varies the tension of said spring means, and transmitting means carried by said member and movable therewith along said first lever arm for transmitting thereto force applied to said transmitting means, and means for applying force from said bellcrank lever to said transmitting means at a mechanical advantage which is constant and independent of said displacement.

3. In an apparatus of the character described, a first lever arm pivotally mounted on a first pivot, means for applying a first force to said lever arm, a member linearly displaceable in a direction substantially parallel to said lever arm, a bellcrank lever pivotally mounted on a pivot fixed with respect to said first pivot, spring means connected between said member and said bellcrank lever so that movement of said member varies the tension of said spring means, a second movable member arranged to be moved by said bellcrank lever and having an elongated surface disposed substantially parallel to said first lever arm, means constraining movement of said second member so that said surface remains parallel to itself in all positions of said second member, and a force transmitting element disposed between said surface and said first lever arm for transmitting force to said first lever arm from said second movable member, said force transmitting element being linearly movable by the first-mentioned member relative to both said surface and said first lever.

4. In an apparatus of the character described, a lever arm pivoted on a fixed axis, means for limiting pivotal movement of said arm to a narrow range, a threaded shaft rotatably mounted substantially parallel to said arm, a carriage having a threaded bore engaged by said shaft, a bellcrank lever pivotally mounted on a fixed axis, a spring between said carriage and one arm of said bellcrank lever, a member independent of said carriage and arranged to be moved by the other arm of said bellcrank lever and having an elongated surface disposed substantially parallel to said lever arm, means constraining movement of said member so that said surface remains parallel to itself in all positions of said member, an arm pivotally mounted on said carriage, rollers carried by said arm and having rolling contact with said surface and said lever arm, and means for rotating said shaft to cause linear movement of said carriage for simultaneously varying the tension of said spring and the distance between the axis of said lever arm and the point of contact therewith of one of said rollers.

5. In an apparatus of the character described, a first lever arm pivotally mounted on a first pivot, means for applying a first force to said lever arm, a member linearly displaceable in a direction substantially parallel to said lever arm, a bellcrank lever pivotally mounted on a pivot fixed with respect to said first pivot, spring means connected between said member and said bellcrank lever so that movement of said member varies the tension of said spring means, a second movable member arranged to be moved by said bellcrank lever and having an elongated surface disposed substantially parallel to said first lever arm, said second member having a portion extending normal to said surface, guide means engaging said portion for constraining movement of said second member to a direction normal to said surface, and a force transmitting element disposed between said surface and said first lever arm and carried by said first-mentioned member for transmitting force to said first lever arm from said second movable member.

6. In an apparatus of the character described, a first lever arm pivotally mounted on a first pivot, means for applying a first force to said lever arm, a member linearly displaceable in a direction substantially parallel to said lever arm, a bellcrank lever pivotally mounted on a pivot fixed with respect to said first pivot, spring means connected between said member and said bellcrank lever so that movement of said member varies the tension of said spring means, a second movable member arranged to be moved by said bellcrank lever and having an elongated surface disposed substantially parallel to said first lever arm, a pair of equal length arms pivotally connected at spaced points to said second member for constraining movement of the latter so that said surface remains parallel to itself in all positions of said second member, and a force transmitting element disposed between said surface and said first lever arm for transmitting force to said first lever arm from said second movable member said force transmitting element being linearly movable by the first-mentioned member relative to both said surface and said first lever.

7. In an apparatus of the character described, a first lever arm pivotally mounted on a first pivot, means for applying a first force to said lever arm, a second lever arm pivotally mounted on a pivot fixed with respect to said first pivot, means for applying a balancing force to said second lever arm, means for varying the effective length of said second lever arm, transmitting means linearly displaceable along said first lever arm for transmitting thereto the balancing force from said second lever arm, and means for simultaneously varying the magnitude of the balancing force applied to said second lever arm and the distance between said first pivot and said transmitting means.

8. In an apparatus of the character described, a first lever arm pivotally mounted on a first pivot, means for applying a first force to said lever arm, a member linearly displaceable in a direction substantially parallel to said lever arm, a bellcrank lever pivotally mounted on a pivot fixed with respect to said first pivot, spring means connected between said member and one arm of said bellcrank lever so that movement of said member varies the tension of said spring means, means for varying the effective length of the other arm of said bellcrank lever, and transmitting means carried by said member and movable therewith along said first lever arm for transmitting thereto force from said other arm of the bellcrank lever.

EDWARD F. CHANDLER.

REFERENCES CITED

The following references are of record in the file of this patent:

UNITED STATES PATENTS

| Number | Name | Date |
| --- | --- | --- |
| 1,202,052 | Gibson | Oct. 24, 1916 |
| 1,821,719 | Messier | Sept. 1, 1931 |
| 2,107,976 | Blasig | Feb. 8, 1938 |
| 2,132,338 | Ziebolz | Oct. 4, 1938 |
| 2,190,506 | Wurr | Feb. 13, 1940 |
| 2,212,085 | Tate | Aug. 20, 1940 |
| 2,325,714 | Stover | Aug. 3, 1943 |
| 2,441,468 | Brownscombe | May 11, 1948 |